Nov. 23, 1954

D. W. AVERY 2,695,255

METHOD OF EXPANDING AN ELASTIC LINER
AGAINST THE INNER SURFACE OF A PIPE

Filed Oct. 25, 1950

INVENTOR.
Douglas W. Avery
BY
Fred C. Matheny
ATTORNEY

United States Patent Office 2,695,255
Patented Nov. 23, 1954

2,695,255

METHOD OF EXPANDING AN ELASTIC LINER AGAINST THE INNER SURFACE OF A PIPE

Douglas W. Avery, Seattle, Wash.

Application October 25, 1950, Serial No. 192,072

5 Claims. (Cl. 154—82)

This invention relates to a method of and means for lining metal pipe with elastic material.

An object of this invention is to provide a novel and highly efficient method by which an elastic liner tube can be introduced into and expanded against and adhesively secured to the inner wall of a metal pipe without danger of leaving blisters or air pockets or unadhered spots between the tube and the pipe.

Another object is to provide simple and efficient means which may be used to facilitate the application of an elastic liner tube to a metal pipe.

In applying liner tubes of elastic material to metal pipes it is necessary that the inside of the pipe and the outside of the tube be coated with fresh rubber cement or like adhesive before the tube is placed within the pipe. In accordance with previously used methods it has been difficult and slow work to get a tube of elastic material, which has been externally coated with fresh cement, into a metal pipe which is internally coated with fresh cement, and then to expand the elastic tube firmly and evenly and smoothly into contact with the inner wall of the pipe without leaving air pockets or blisters or unadhered spots between the tube and the pipe. Also previously used methods of applying elastic liner tubes to metal pipes have sometimes resulted in unequal tensioning of the walls of the elastic tubes and even in the formation of wrinkles in the walls of such elastic liner tubes.

In applying elastic liner tubes to metal pipes it is difficult, after an externally cemented elastic liner tube has been positioned within an internally cemented pipe, to evenly press the tube outwardly against the pipe by the use of tools inside of the tube. This is especially true in the instance of pipes of small diameter, as the pipes may range in size between pipe of about two inches diameter to pipe of large enough diameter so that a workman can crawl into it. If an elastic liner tube within a pipe to which it is to be adhered is sealed at the ends and air under pressure is admitted thereto to blow up the tube and thus press it outwardly against the wall of the pipe some of the air between the tube and the pipe is very liable to be trapped between said tube and pipe and thus form air pockets or blisters or patches where the tube is not adhered to the pipe.

It is an object of this invention to apply an annular ring of air under pressure to the inside of the tube and to move this ring of applied air pressure progressively from one end to the other of the tube so that an externally cemented elastic liner tube is progressively expanded against the wall of an internally cemented pipe in such a manner as to expel or squeeze out all of the air from between the tube and the pipe so that there will not be any air pockets or blisters formed between the tube and the pipe.

Another object of this invention is to devise highly efficient means for facilitating the application of an expanding ring of air under pressure to the inside of an elastic liner tube and for moving this expanding ring of air progressively within the elastic liner tube from one end to the other of such tube.

Another object of this invention is to devise a highly efficient method of and means for getting an externally cemented liner tube of elastic material into an internally cemented pipe without dragging one cement coated surface over another cement coated surface.

Other objects are to reduce the time and labor and expense incidental to applying elastic liner tubes to metal pipes and to provide for better and smoother and more efficient application of elastic liner tubes to metal pipes.

Other objects of this invention will be apparent from the following description taken in connection with the accompanying drawings.

In the drawings Figure 1 is a somewhat diagrammatic fragmentary longitudinal sectional view showing an elastic liner tube having two longitudinally doubled strips of fabric applied thereto preparatory to inserting said liner tube with the fabric strips thereon into a pipe to which a lining is to be applied.

Figure 3:
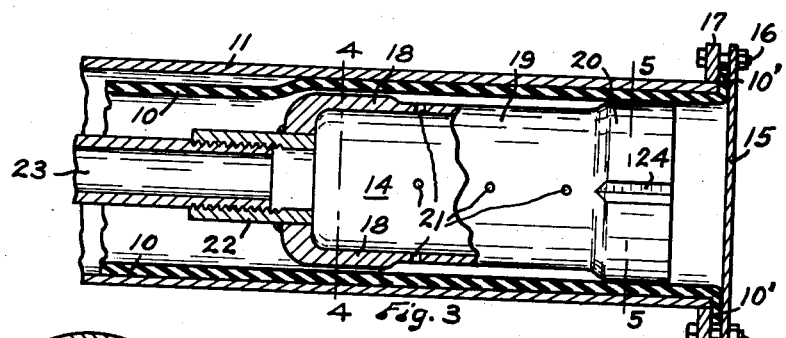
Fig. 3 is a fragmentary longitudinal sectional view showing an end portion of a piece of metal pipe with an elastic liner tube positioned therein and with an air control tool in the liner tube and a closure member or cap applied to the end of the pipe adjacent the air control tube.
Figure 4:
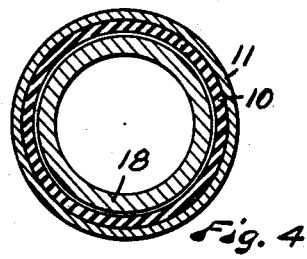
Figure 5:
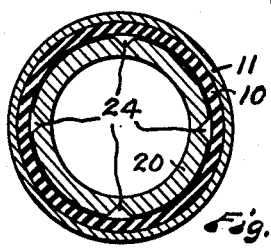

Figs. 4 and 5 are sectional views taken substantially on broken lines 4—4 and 5—5 of Fig. 3.

Figure 6:
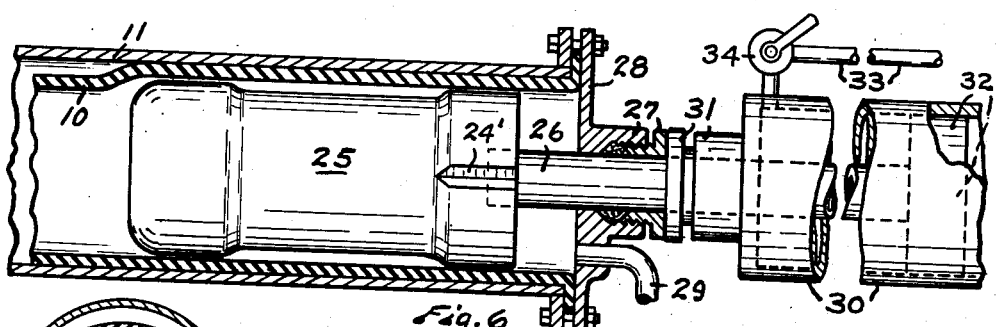

Fig. 6 is a view similar to Fig. 3 showing a modified form of air control tool and modified end plate closure means together with modified air supply means and air control tool hold back means.

Figure 7:
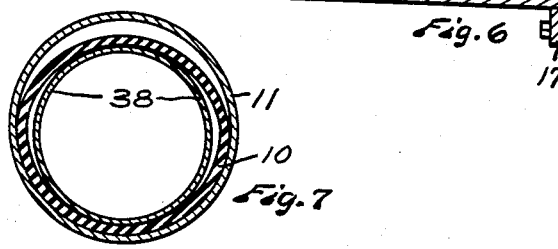

Fig. 7 is a view in cross section illustrating means for supporting an elastic liner tube which has a tendency to collapse or flatten out.

Like reference numerals designate like parts throughout the several views.

Figure 1:
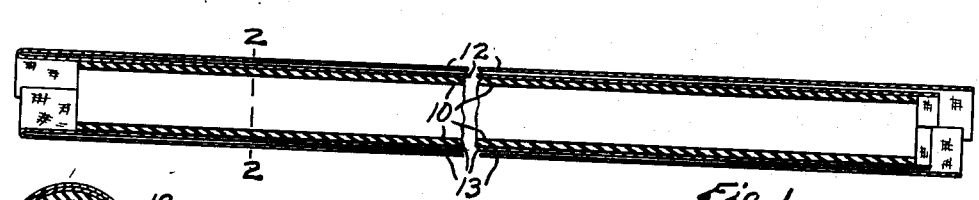
Figure 2:
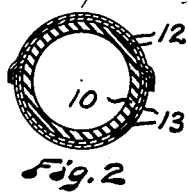
Fig. 2 is a sectional view, on a larger scale than Fig. 1, taken substantially on broken line 2—2 of Fig. 1.

In accordance with this invention an elastic liner tube 10 of rubber or the like and of an external diameter slightly less than the internal diameter of a piece of pipe 11 which is to be lined therewith is introduced into and adhered to the inner wall of the pipe 11 in the following manner:

The internal surface of the pipe 11 and the external surface of the elastic liner tube 10 are each thoroughly cleaned and are each coated with rubber cement or like adhesive. After the cement has been applied to the elastic liner tube 10 at least two longitudinally doubled strips 12 and 13 of pliable material such as cotton cloth are laid against and drawn around the tube 10 in such a manner that their edge portions overlap and the strips completely envelop the tube. This protects the cement on the tube and prevents it from coming into contact with the internally cemented surface of the pipe 11 as the tube is being drawn into the pipe. Preferably each strip 12 and 13 is more than twice the length of the elastic liner tube 10 so that when the strips 12 and 13 are doubled and applied to the tube 10 as shown in Figs. 1 and 2, the strips will extend beyond both ends of the elastic liner tube 10.

After the strips 12 and 13 have been applied to the elastic liner tube 10, as above described, the tube 10 together with the strips 12 and 13 are drawn into the piece of metal pipe 11 and are preferably positioned within the pipe 11 so that they protrude a short distance from each end of the pipe. This may be accomplished by the use of a suitable line or cable which is attached to one end portion of the tube and strips and is used to pull said tube and strips into the pipe 11. For long pipes of large diameter power may be used to draw the liner tube and strips into the same. As these parts are being drawn into a previously cemented pipe the cloth strips will slide relative to the cement on the wall of the pipe without adversely affecting the cement.

After an elastic liner tube 10 has been positioned in a pipe 11, as above described, the longitudinally doubled strips of fabric 12 and 13 are withdrawn without disturbing the tube or displacing the same or injuring the cement on the outside of said tube by pulling on the outermost loose end of each strip. This peels the strips 12 and 13 out of the pipe 11 without slidably moving said strips relative to the elastic liner tube 10. Thus the tube 10 is not displaced and the cement is not injured and the strips come out easily and without tearing. If it be attempted to pull a single strip of cloth out from between a liner tube 10 and a pipe 11 within which the liner tube is disposed then the strip will have to be slidably moved relative to both the pipe and the tube and is liable to be bound so tightly that it will tear and can not be gotten out of the pipe. When these strips 12 and 13 are longitudinally doubled, as above set forth, then these strips will come out easily without pulling on the elastic liner tube and with a minimum of disturbance to the cement coated surfaces of the elastic liner tube 10 and the pipe 11.

After the strips 12 and 13 have been withdrawn a short portion of the tube 10 adjacent one end of the pipe 11 is firmly pressed outwardly against the pipe 11 and caused to adhere to said pipe 11. This may be done with a hand tool. The tube 10 is shown so adhered in Fig. 3. A small amount of soapstone or talc or like material is then placed in the end portion of the tube 10 to lubricate the inner walls thereof. A cylindrical air control tool designated generally by 14 is then placed in the portion of the tube 10 which is adhered to the walls of the pipe 11. The end portions 10' of the tube 10 are then turned outwardly and an end closure plate 15 is applied to the adjacent end of the pipe 11 and secured, as by bolts 16, to an end flange 17 on said pipe 11.

For the purpose of this description the end portion of the tool 14 which is shown at the right in Fig. 3 is regarded as the rear end portion of said tool.

The tool 14 is of substantial length and preferably is hollow to minimize the weight thereof. Said tool 14 has a forward end portion 18 which is of slightly smaller external diameter than is the interior of the elastic liner tube 10 after it has been adhered to the pipe 11. This provides for a narrow annular air passageway between the head 18 of the air control tool and the elastic liner tube in which it operates. The rear end portion 20 of the air control tool is a little larger than the front end portion 18 but is of small enough diameter to move freely in the elastic liner tube 10 and serves as a guide member to prevent tilting of the tool 14. The intermediate portion 19 of the air control tool is smaller in diameter than the two end portions 18 and 20 of said tool and is provided with air outlet perforations 21 through which air may pass from the inside to the outside of the tool. An internally threaded nipple or coupling member 22 is welded or otherwise rigidly secured to the forward end of the air tool 14 and a tubular air supply and hold back member or pipe 23 is threaded into said nipple 22.

Preferably the guide portion 20 at the rear end of the air control tool has longitudinal grooves 24 in the peripheral portion thereof to provide for a free flow of air under pressure past the same. Any suitable means, either hand operated or power operated, depending on the size of the air control tool, may be used in connection with the air control tool to govern the speed of movement of said tool in an elastic liner tube 10.

After the pipe 11, liner tube 10, air control tool 14 and other parts associated therewith have been set up in the manner just described and shown in Fig. 3 then air under pressure is admitted through the hold back tube 23 into the air control tool 14. This air under pressure passes through the perforations 21 and rearwardly through grooves 24 and forwardly in an annular ring past the enlarged end portion 18 of the air control tool 14. Pressure of this air against the rear end of the air control tool 14 drives this tool forwardly, that is toward the left in Fig. 3, at a speed which is controlled by the hold back tube 23. At the same time a thin annular ring of compressed air will be continuously forced past the larger forward end portion 18 of the air control tool between said end portion 18 and the inner wall of the elastic liner tube 10. This thin annular body of compressed air will progressively and smoothly expand and press the elastic liner tube 10 against the wall of the pipe 11 and the liner tube will be caused to adhere uniformly to the pipe 11 without forming any air pockets or blisters between the tube and the pipe.

The air control tool 25 shown in Fig. 6 is similar to the air control tool 14 shown in Fig. 3 except that the coupling member 22 and perforations 21 which are shown in Fig. 3 are preferably omitted in Fig. 6 and air supply and hold back means of different form are provided. The hold back means shown in Fig. 6 includes a tension rod 26 secured to the rear end portion of the air control tube 25 and extending out through a packing gland 27 in an end plate 28. The end plate 28 is secured to an end flange 17 of a metal pipe 11. An air inlet conduit 29 extends through the end plate 28 and communicates with the exterior of an elastic liner tube 10 for the purpose of delivering air under pressure into the elastic liner tube 10 between the end plate 28 and the rear end of the air control tool 25. Longitudinally extending air passageways 24' are provided in the exterior of the larger end portion of the air control tool 25 to allow a free passage of air past this part of the tool.

As illustrative of one satisfactory means which may be connected with the hold back rod 26 to govern the speed of movement of the air control tool 25 I have shown a hydraulic cylinder 30 into which the tension rod 26 extends by way of a packing gland 31. The cylinder 30 may be of any desired length, depending on the length of the pipe 11 which is being lined, and said cylinder 30 may be positioned so that it will react against the end plate 28 as by positioning the cylinder 30 so that the two packing glands 27 and 31 abut against each other.

A piston 32 is provided on the tension rod 26 within the cylinder 30. A liquid control conduit 33 communicates with the end portion of the cylinder 30 adjacent the pipe 11 and a valve 34 is provided in said conduit 33 to control the escape of liquid from the end portion of the cylinder 30 adjacent the pipe 11 and thereby control the speed of movement of the air control tool 25.

The mode of operation of the structure shown in Fig. 6 is substantially the same as the mode of operation of the structure shown in Fig. 3 in that air under pressure admitted back of the air control tool 25 moves the tool in the liner tube 10 and, at the same time discharges in a ring past the larger forward end portion of said tool and expands the elastic liner tube into smooth contact with the inner wall of the pipe 11.

Liner tubes of small diameter ordinarily will not tend to flatten or collapse under their own weight but elastic liner tubes of large diameter may tend to collapse and lie in the bottom portions of the pipes 11 into which they have been drawn. To support large elastic liner tubes and keep them approximately cylindrical I preferably insert in the elastic liner tube a mandrel 38 of light metal. One of these mandrels of tubular cylindrical construction is shown in Fig. 7 and is disposed within an elastic liner tube of slightly larger diameter than the mandrel. When a mandrel 38 is thus used the air control tool pushes the mandrel out of the tube as it moves along the tube.

In both the Fig. 3 structure and the Fig. 6 structure the compressed air exerts a pressure against the rear end of the air control tool to move the tool in the elastic liner tube and the speed of movement of the tool is governed by a control means external to the elastic liner tube and pipe. Also in both instances an annular body of compressed air is continuously forced past the larger forward end portion of the air control tool and this annular body of air expands the elastic liner tube progressively against the inside of the pipe. When the air control tube is in use and is moving through an elastic liner tube the air in the tube back of the air control tool is under substantial pressure and moves the tool. Also this pressure is exerted against the walls of the tube which have been expanded into contact with the walls of the pipe. Thus the elastic liner tube is progressively and smoothly expanded or pressed against the pipe to adhere the two cement coated surfaces together and is held in contact with said pipe until the air control tool reaches the far end of the tube.

After an elastic liner tube has been applied to a pipe as just explained any suitable curing process may be used to complete the bond between the tube and the pipe.

The foregoing description and accompanying drawings clearly disclose preferred embodiments of my invention but it will be understood that this disclosure is merely illustrative and that changes may be made within the scope of the following claims.

I claim:

1. The method of expanding a cement coated elastic liner tube against a cement coated inner surface of a metal pipe within which the liner tube extends lengthwise, which comprises progressively moving through the elastic liner tube an air control tool of slightly less diameter than the liner tube and continuously passing air under pressure between the air control tool and the liner tube to progressively expand the elastic liner tube against the pipe as the air control tool is moved longitudinally through the elastic liner tube.

2. The method of expanding an elastic liner tube outwardly against the wall of a pipe within which said liner tube is disposed and extends longitudinally and in which adhesive is provided between the tube and the pipe, which comprises inserting in one end portion of the liner tube a cylindrical air control tool which is of slightly smaller external diameter than is the maximum internal diameter of the elastic liner tube when the elastic liner tube is expanded against the pipe; closing the end of the elastic liner tube adjacent the air control tool; admitting air under pressure between said tool and the closed end of said tube, whereby the tool is moved longitudinally toward the other end of the tube and air is discharged in an annular layer between the tool and the tube to expand the tube against the pipe; and controlling the speed of movement of the tool in the tube.

3. In apparatus for expanding an elastic liner tube outwardly against the wall of a pipe within which said liner tube is disposed and in which adhesive is provided between the tube and the pipe, a cylindrical air control tool adapted to be initially positioned within the elastic liner tube adjacent one end thereof, the external diameter of the tool being slightly less than the maximum expanded internal diameter of the elastic liner tube to thereby provide for a narrow annular air passageway between the tool and the elastic liner tube; closure means adapted to close the end of the elastic liner tube adjacent the tool, the other end of said elastic liner tube being open to the outlet of air from the tube; and compressed air inlet means communicating with the elastic liner tube supplying compressed air between the end closure means of the tube and the tool, whereby the compressed air will move the tool toward the open end of the elastic liner tube and will be discharged through the narrow annular passageway between the elastic liner tube and the tool to expand the elastic liner tube against the pipe.

4. The method of positioning within an internally cement coated metal pipe an externally cement coated liner tube of smaller diameter than the pipe, comprising applying to the exterior of the tube two strips of fabric which extend around and envelop the tube, each of said strips being more than twice the length of the tube and being medially doubled lengthwise whereby the two ends of each strip overhang one end of the tube and the bight portion of each strip overhangs the other end of the tube; drawing the tube with the strips of fabric thereon into the pipe; and withdrawing the strips of fabric by pulling on the end portion of the outermost lap of each strip.

5. The method of lining a metal pipe with elastic material which comprises applying cement to the inside of the pipe, forming from elastic material a tube having a external diameter slightly less than the internal diameter of the pipe; applying cement to the exterior of said elastic tube; applying to the exterior of the cement coated tube two strips of fabric which extend around and envelop the tube, each of said strips of fabric being more than twice the length of the tube and being medially doubled lengthwise, whereby the doubled strips overhang the ends of the tube; drawing the strip enveloped tube into the pipe; withdrawing the strips by pulling on the end portion of the outermost lap of each strip; and expanding the elastic liner tube into contact with the wall of the pipe by progressively applying to the inside of the elastic liner tube the outward pressure of a relatively longitudinally moving annular layer of compressed air.

References Cited in the file of this patent

UNITED STATES PATENTS

| Number | Name | Date |
|---|---|---|
| 642,537 | Thoma | Jan. 30, 1900 |
| 642,539 | Thoma | Jan. 30, 1900 |
| 1,721,838 | Semon et al. | July 23, 1929 |
| 2,343,225 | Pray et al. | Feb. 29, 1944 |
| 2,430,273 | Browning | Nov. 4, 1947 |